T. A. F. HOLMGREN & K. A. LINDSTRÖM.
EXCESS VOLTAGE PROTECTING DEVICE FOR ELECTRIC LINES.
APPLICATION FILED FEB. 17, 1914.
1,236,563.
Patented Aug. 14, 1917.
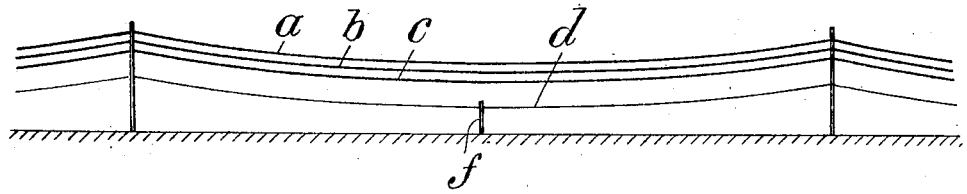
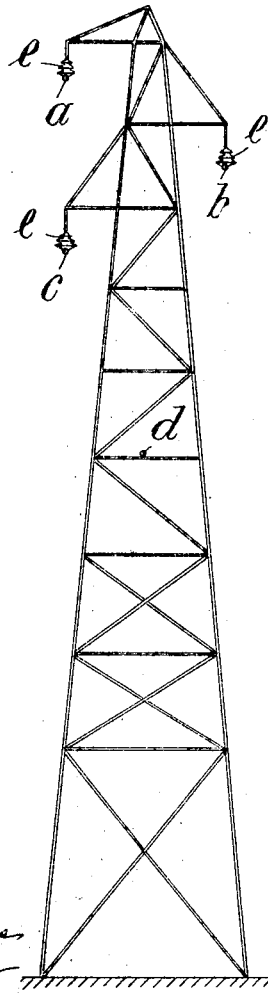
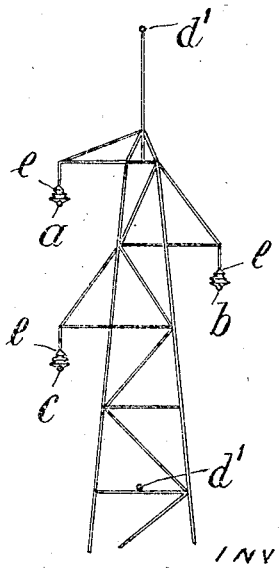

UNITED STATES PATENT OFFICE.

TORSTEN ANDREAS FRITHIOFSSON HOLMGREN, OF TROLLHÄTTAN, AND KARL ARVID LINDSTRÖM, OF STOCKSUND, SWEDEN.

EXCESS-VOLTAGE-PROTECTING DEVICE FOR ELECTRIC LINES.

1,236,563.      Specification of Letters Patent.      Patented Aug. 14, 1917.

Application filed February 17, 1914. Serial No. 819,175.

*To all whom it may concern:*

Be it known that we, TORSTEN ANDREAS FRITHIOFSSON HOLMGREN, chief engineer, subject of the King of Sweden, residing in Trollhättan, in the Kingdom of Sweden, and KARL ARVID LINDSTRÖM, professor, subject of the King of Sweden, and residing in Stocksund, in the Kingdom of Sweden, have invented certain new and useful Improvements in Excess-Voltage-Protecting Devices for Electric Lines, of which the following is a specification.

A common ground for disturbances in the function of electric transmission lines consists, as is well known, of the so-called excess-voltages, *i. e.* the rises of potential which may occur in said lines for several various reasons and which cause disruptive or surface discharges over the insulators and thus spoil the latter.

An excess voltage protecting device, the purpose of which is to prevent the formation of such excess voltage, must be adapted for conducting off rapidly enough the electric charge which may be considered as the direct cause of the rise of potential, and only in the degree as the protecting device is capable thereof, it will fulfil its purpose efficiently.

The present invention relates to a device for this purpose which consists in a conducting wire mounted adjacent to (above, beneath or at the side of) the wires or wire strands forming the electrical line proper. This conducting wire shall have a good electrical connection to earth and consequently in this respect it corresponds to the generally-known and rather frequently used ground-wire (or wire strand). According to the present invention, this ground wire shall be made with such a small diameter (*i. e.* such a small sectional area) that the electrical field which is formed around the same at a rise of potential in the transmission line or wires proper is sufficiently strong or concentrated to produce a so-called corona effect, *i. e.* the phenomenon whereby a discharge (in this case a harmless one) occurs through the air between the transmission line or wires and the ground wire. By this means, the electrical charge corresponding to the rise of potential is discharged or conducted away from the transmission line or wires whereby the said rise is prevented. The required dimensions and position of the ground wire for the aforesaid purpose being easy to calculate in a known manner, the position and dimensions can be chosen in each case which are suitable for causing the ground wire to "react" for the excess voltage, on one hand but on the other not to cause losses at the working voltage normal for the transmission line or wires. Thus by the present invention a new technical effect is obtained from the usual ground wire.

Instead of one ground wire two or more may of course be used whereby the efficiency of the arrangement is increased in a corresponding degree.

In order to make the invention better understood there is shown on the accompanying drawing by way of example the arrangement of an electric line embodying the present invention. Figure 1 illustrates diagrammatically a line according to the invention in a side view, while Fig. 2 shows a cross section of the same on a larger scale and Figs. 3–5 show cross sections of three different forms of the protecting wire on a still larger scale. Fig. 6 shows in the same way as Fig. 2 a line with several excess voltage protecting wires. In the different figures the same parts are indicated by the same letters of reference.

In Figs. 1 and 2, *a, b, c,* are the three line wires, for instance of a three-phase system, which in the example shown are to angularly arranged and hung on insulators depending from projecting portions of a pole *p*. The arrangement and number of these wires may, however, of course be subject to any modifications occurring in the art. *d* is the protecting wire which may be suspended directly on the frame work of the iron poles when such are used or in any other way connected to earth. This wire may, as shown in Fig. 1, be supported also by intermediary poles *f*, arranged between the poles *p* supporting the line wires. The dimensions and cross-section of the wire *d* should be such that the electric field occurring around it in the case of an excess voltage will be sufficient to produce a so-called corona effect. For this purpose, an edged cross section, as shown in Figs. 4 and 5, may be suitable for the wire *d*, but a circular cross-section, as shown in Fig. 3, may also be employed.

According to Fig. 6 several protecting wires *d'* are arranged connected to the earth in any suitable manner.

Having now described our invention, we declare, that what we claim is:—

1. Method of protecting electric lines from excess voltage consisting in arranging a conducting member running along the transmission line wires proper, said conducting member being connected to the earth in such a way that it will have substantially the same potential as the earth and located in such a distance to the line conductors proper and dimensioned in such a manner that a discharging effect termed "corona" takes place on the surface of the said conducting member, when the potential of the line conductors proper rises above the normal working voltage.

2. Excess voltage protecting device for electric lines comprising a conductor connected to the earth in such a way that it will have substantially the same potential as the earth and arranged along the said line conductors proper, and located in such a distance to the line conductors proper and dimensioned in such a manner that a discharging effect termed "corona" takes place on the surface of the earth connected conductor, when the potential of the line conductors proper rises above the normal working voltage.

3. Excess voltage protecting device for electric lines comprising several conductors connected to the earth in such a way that they will have substantially the same potential as the earth, arranged along the said line conductors proper and located in such a distance to the same and dimensioned in such a manner that a discharging effect termed "corona" takes place on the surfaces of the earth connected conductors, when the potential of the line conductors proper rises above the normal working voltage.

In witness whereof we have hereunto set our hands in presence of two witnesses.

TORSTEN ANDREAS FRITHIOFSSON HOLMGREN.
KARL ARVID LINDSTRÖM.

Witnesses:
GRETA PRIEN,
AUG. HOGELIN.